US009876436B2

(12) United States Patent
Chen

(10) Patent No.: US 9,876,436 B2
(45) Date of Patent: *Jan. 23, 2018

(54) CURRENT-RESONANCE TYPE SWITCHING POWER SUPPLY APPARATUS

(71) Applicant: FUJI ELECTRIC CO., LTD., Kawasaki-shi, Kanagawa (JP)

(72) Inventor: Jian Chen, Matsumoto (JP)

(73) Assignee: FUJI ELECTRIC CO., LTD., Kawasaki-shi, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/394,908

(22) Filed: Dec. 30, 2016

(65) Prior Publication Data

US 2017/0110974 A1    Apr. 20, 2017

Related U.S. Application Data

(63) Continuation of application No. PCT/JP2015/084133, filed on Dec. 4, 2015.

(30) Foreign Application Priority Data

Jan. 20, 2015 (JP) .................................. 2015-008912
Sep. 2, 2015 (JP) .................................. 2015-172624

(51) Int. Cl.
*H02M 3/335* (2006.01)
*H02M 1/08* (2006.01)
(Continued)

(52) U.S. Cl.
CPC ......... *H02M 3/33553* (2013.01); *H02M 1/08* (2013.01); *H02M 1/32* (2013.01); *H02M 2001/0009* (2013.01)

(58) Field of Classification Search
CPC . H02M 2001/0032; H02M 2001/0035; H02M 3/33507; H02M 3/33546; H02M 2007/4815; H02M 7/537
(Continued)

(56) References Cited

U.S. PATENT DOCUMENTS 5,777,860 A    7/1998 Halbert
6,087,782 A    7/2000 Majid et al.
(Continued)

FOREIGN PATENT DOCUMENTS

JP    2006-204044 A    8/2006
JP    2009-189108 A    8/2009
(Continued)

*Primary Examiner* — Jeffrey Sterrett
(74) *Attorney, Agent, or Firm* — Rabin & Berdo, P.C.

(57) ABSTRACT

A switching power supply apparatus of a current-resonance type, including a first switching element and a second switching element connected in series, a series circuit of a resonant reactor and a resonant capacitor connected in parallel to the first switching element or the second switching element, a control circuit configured to alternately turn on and off the first switching element and the second switching element, and a load detection circuit. The load detection circuit includes a shunt circuit which shunts a resonant current flowing through the resonant reactor and resonant capacitor connected in series to obtain a shunted current, converts the shunted current to a first voltage signal, and outputs the first voltage signal, a switching circuit which switches between the first voltage signal and a second voltage signal of a ground level to generate a third voltage signal, and an averaging circuit which averages the third voltage signal.

8 Claims, 12 Drawing Sheets

(51) Int. Cl.
*H02M 1/32* (2007.01)
*H02M 1/00* (2006.01)

(58) Field of Classification Search
USPC .................. 363/21.02, 21.08, 21.09, 95, 97
See application file for complete search history.

(56) References Cited

U.S. PATENT DOCUMENTS

| | | |
|---|---|---|
| 2006/0164872 A1 | 7/2006 | Fukumoto |
| 2013/0099788 A1* | 4/2013 | Xu ...................... H02M 3/3376 324/322 |
| 2013/0301305 A1 | 11/2013 | Orr et al. |
| 2017/0110974 A1* | 4/2017 | Chen ................. H02M 3/33553 |
| 2017/0155333 A1* | 6/2017 | Chen ...................... H02M 1/08 |
| 2017/0201183 A1* | 7/2017 | Chen ................. H02M 3/33546 |
| 2017/0237356 A1* | 8/2017 | Chen ................. H02M 3/33553 |

FOREIGN PATENT DOCUMENTS

| | | |
|---|---|---|
| JP | 2012-170218 A | 9/2012 |
| JP | 2014-060895 A | 4/2014 |

* cited by examiner

CURRENT-RESONANCE TYPE SWITCHING POWER SUPPLY APPARATUS

CROSS-REFERENCE TO RELATED APPLICATION

This application is a continuation application of International Application PCT/JP2015/084133 filed on Dec. 4, 2015 which designated the U.S., which claims priority to Japanese Patent Application No. 2015-008912, filed on Jan. 20, 2015, and Japanese Patent Application No. 2015-172624, filed on Sep. 2, 2015, the entire contents of which are incorporated herein by reference.

BACKGROUND OF THE INVENTION

1. Field of the Invention

The embodiments disclosed herein relate to switching power supply apparatuses, and in particular relate to a switching power supply apparatus which includes a current-resonance type DC-DC (direct current-direct current) switching converter and which may handle burst control and the like and detect a load state with high precision.

2. Background of the Related Art

The current-resonance type DC-DC switching converter is widely employed as the power supply adapter of a television or the like because it is suitable for achieving an increase in efficiency and a reduction in thickness. In a switching power supply apparatus connected to an AC power supply for a load exceeding a predetermined level, a DC voltage kept constant by a power factor correction (PFC) circuit is used as its input voltage.

Such a switching power supply apparatus detects a load state indicating whether a load is heavy or light, in addition to controlling an output voltage to be constant, and when the load is light, performs, for example, a burst operation of temporarily stopping switching. This load state may be known by directly detecting a current output from the secondary side of a transformer for current resonance. However, because the detected load state needs to be transmitted to a control IC (Integrated Circuit) on the primary side of the transformer, the cost of a feedback circuit therefor poses a problem. For this reason, a load state is usually detected on the primary side of a transformer.

In detecting a load state on the primary side of a transformer, there is known a method for detecting, as a load state, the current flowing through a resonant circuit (e.g., see Japanese Laid-open Patent Publication No. 2012-170218, paragraphs [0050] to [0052] and FIG. 4). According to the description of Japanese Laid-open Patent Publication No. 2012-170218, the load component of a current flowing through the resonant circuit is detected in synchronization with an on-period of a high-side switching element or a low-side switching element. Accordingly, the detectable current is the load component only during a period when a high-side or low-side switching element is turned on, i.e., a one-sided load component during switching. This method is practical only on the premise that a state in a period in which the other switching element is turned on and current detection is not performed is identical to a state in a period in which current detection is performed. Accordingly, the high-side or low-side switching element needs to continue to be operated always with the same on-time ratio (i.e., 50%) (balance-controlled). Consequently, this is not a current detection method accurately indicating a load state. In the following, the burst operation and unbalanced operation will be described as an example unable to accurately indicate a load state.

First, a case is described where the burst operation is performed. Consider a current resonance converter, in which high-side and low-side switching elements are alternately controlled with the same on-width. Here, in performing the burst control with a 10% duty ratio (e.g., with the switching operation period of 1 millisecond (ms) and the switching stop period of 9 ms at a switching cycle of 10 microseconds (μs) (the switching frequency is 100 kHz)), the actual load is only 10 watt (W) even if the load component during the switching operation period is recognized as 100 W. This is expressed with the formula below $$Pload = Pdet \times D$$

where Pload is a load, Pdet is the load component during the switching operation period, and D is the duty ratio of burst. Therefore, even if the load component during the switching operation period is detected, a load state will not be able to be detected unless the burst duty ratio is known.

Next, an operation state (the so-called unbalanced control) in which the high-side and low-side switching elements are alternately controlled with different on-widths (e.g., see Japanese Laid-open Patent Publication No. 2006-204044, paragraph [0020]) will be described. Here, assume that the high-side switching element operates with the on-width of 30% and the low-side switching element operates with the on-width of 70%, for example. In this case, if a load component is detected during the high-side operation period in accordance with the scheme of Japanese Laid-open Patent Publication No. 2012-170218, the load state will be recognized as an almost no-load state. On the other hand, if a load component is detected during the low-side operation period, the load will be detected larger than the actual load. As described above, because a load component has the dependency on the high-side and low-side operation rates, a load state is not accurately detected.

As described above, in the technique of Japanese Laid-open Patent Publication No. 2012-170218, a load state is estimated by detecting the current flowing through a resonant circuit in synchronization with the on-period of the high-side switching element or low-side switching element, and therefore there is a problem that the technique is unable to handle the burst control or the like.

SUMMARY OF THE INVENTION

According to one aspect of the present disclosure, there is provided a switching power supply apparatus of a current-resonance type, including: a first switching element and a second switching element connected in series; a series circuit of a resonant reactor and a resonant capacitor connected in parallel to the first switching element or the second switching element; and a control circuit which alternately turns on and off the first switching element and the second switching element, the switching power supply apparatus further comprising a load detection circuit, the load detection circuit including: a shunt circuit which shunts a resonant current flowing through the resonant reactor and resonant capacitor connected in series, and converts a shunted current to a first voltage signal and outputs the first voltage signal; a switching circuit which switches between the first voltage signal and a second voltage signal of a ground level to generate a third voltage signal; and an averaging circuit which averages the third voltage signal.

The object and advantages of the invention will be realized and attained by means of the elements and combinations particularly pointed out in the claims.

It is to be understood that both the foregoing general description and the following detailed description are exemplary and explanatory and are not restrictive of the invention.

DETAILED DESCRIPTION OF THE INVENTION

Embodiments discussed herein relate to detection of a load state, and are based on the principle that an input power just needs to be detected (i.e., the output power is an input power multiplied by a power conversion efficiency), instead of detecting a load component of a resonant current as in Japanese Laid-open Patent Publication No. 2012-170218. Therefore, in the embodiments, a signal proportional to the input current of a switching power supply apparatus is always generated both when a switching element is turned on and when a switching element is turned off.

Hereinafter, the embodiments disclosed herein will be described in detail with reference to the accompanying drawings. Note that each embodiment may be implemented as a combination of a plurality of embodiments as long as it does not cause any contradiction. Moreover, in the following description, the same reference sign may be used and described for the name of a terminal, and the voltage, signal, and the like at this terminal.

First Embodiment

Figure 1:
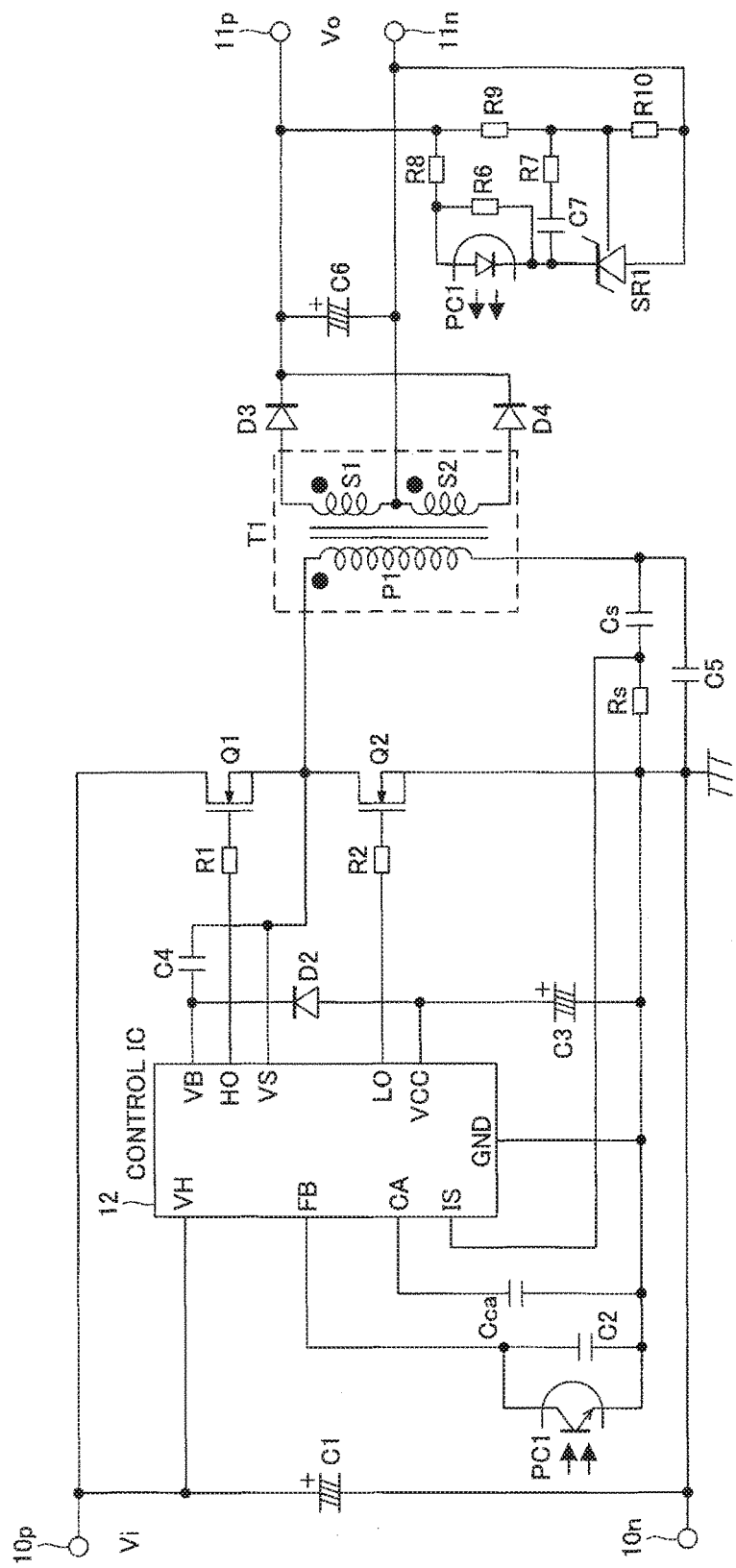
FIG. 1 is a circuit diagram illustrating a switching power supply apparatus according to a first embodiment.
Figure 2:
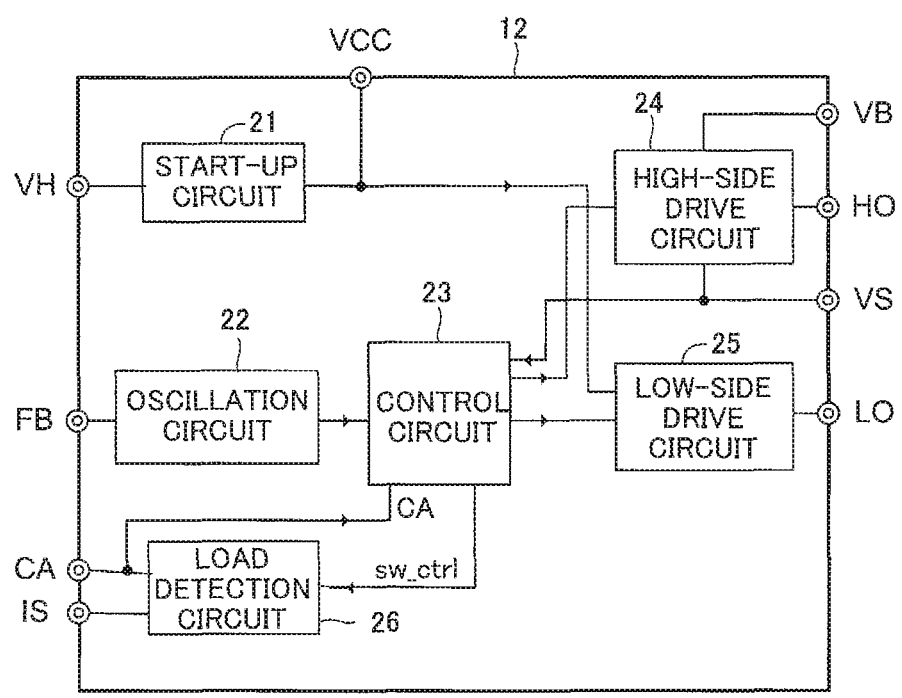
FIG. 2 illustrates a configuration example of a control IC.
Figure 3:
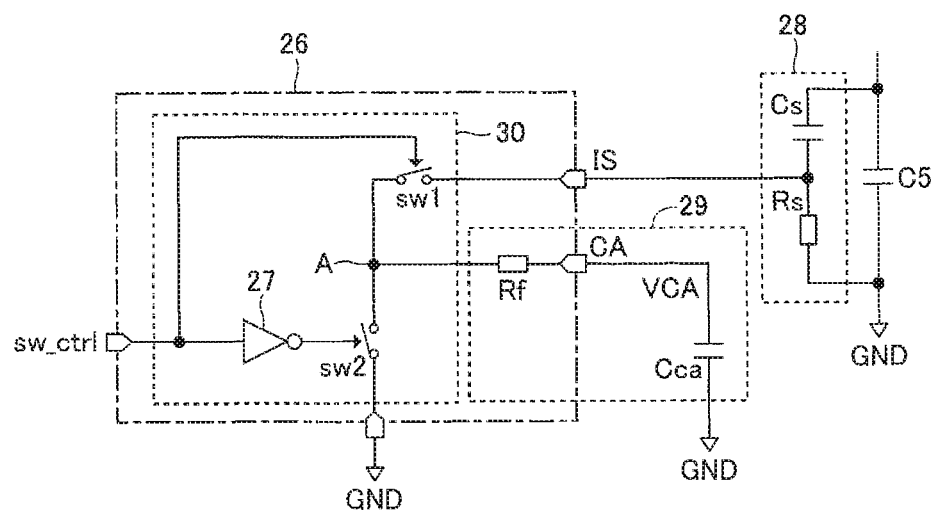
FIG. 3 illustrates a configuration example of a load detection circuit.
Figure 4:
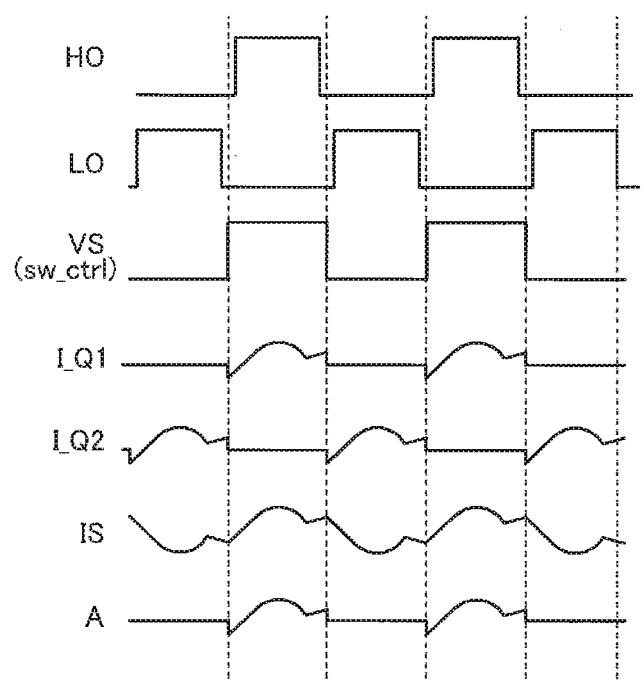
FIG. 4 is a timing chart during a normal operation.
Figure 5:
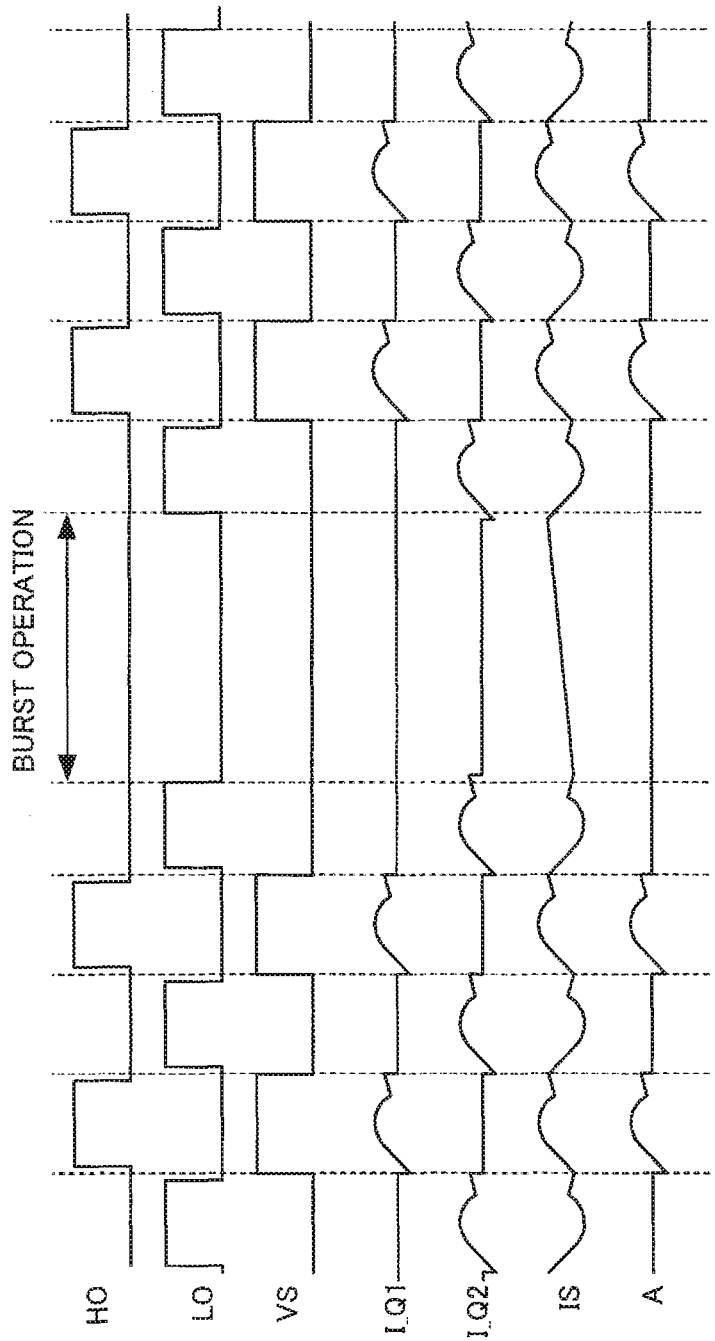
FIG. 5 is a timing chart during a burst operation.

FIG. 1 is a circuit diagram illustrating a switching power supply apparatus according to a first embodiment, FIG. 2 illustrates a configuration example of a control IC, FIG. 3 illustrates a configuration example of a load detection circuit, FIG. 4 is a timing chart during a normal operation, and FIG. 5 is a timing chart during a burst operation.

The switching power supply apparatus according to the first embodiment has an input capacitor C1 connected between input terminals 10p and 10n, and receives, for example, a high and constant DC input voltage Vi generated by a power factor correction circuit. A series circuit of a high-side switching element Q1 and low-side switching element Q2 is connected between the input terminals 10p and 10n, and constitutes a half-bridge circuit. An N-channel MOSFET (Metal-Oxide-Semiconductor Field-Effect Transistor) is used as the switching elements Q1 and Q2, in the illustrated example.

The common connection point between the switching elements Q1 and Q2 is connected to one end of a primary winding P1 of a transformer T1, while the other end of the primary winding P1 is connected to the ground via a resonant capacitor C5. Here, the resonant capacitor C5 and a resonant reactor having a leakage inductance component which is increased by reducing the coupling coefficient between the primary winding P1 and secondary windings S1 and S2 of the transformer T1 constitute a resonant circuit. Note that, instead of using a leakage inductance, an inductance different from the inductance constituting the transformer T1 may be connected in series to the resonant capacitor C5, and the inductance may serve as the resonant reactor of the resonant circuit.

One end of the secondary winding S1 of the transformer T1 is connected to an anode terminal of a diode D3, while one end of the secondary winding S2 is connected to an anode terminal of a diode D4. The cathode terminals of the diodes D3 and D4 are connected to the positive electrode terminal of an output capacitor C6 and to an output terminal 11p. The negative electrode terminal of the output capacitor C6 is connected to the common connection point between the secondary windings S1 and S2 and to an output terminal 11n. The secondary windings S1 and S2, the diodes D3 and D4, and the output capacitor C6 constitute a circuit which converts the AC voltages generated in the secondary windings S1 and S2, to a DC voltage by rectifying and smoothening the AC voltages, and constitutes the output circuit of the switching power supply apparatus.

The positive electrode terminal of the output capacitor C6 is connected to the anode terminal of the light emitting diode of a photo coupler PC1 via a resistor R8, while the cathode terminal of the light emitting diode is connected to the cathode terminal of a shunt regulator SR1. A resistor R6 is connected in parallel between the anode terminal and cathode terminal of the light emitting diode. The anode terminal of the shunt regulator SR1 is connected to the output terminal 11n. The shunt regulator SR1 has a reference terminal connected to the connection point between the resistors R9 and R10 connected in series between the positive electrode terminal and negative electrode terminal of the output capacitor C6. The shunt regulator SR1 has a series circuit of a resistor R7 and capacitor C7 connected between the reference terminal and the cathode terminal. This shunt regulator SR1 is for feeding to the light emitting diode the current in accordance with a difference between a potential obtained by dividing an output voltage Vo (the voltage between both ends of the output capacitor C6) and a built-in reference voltage. The photo-transistor of the photo coupler PC1 has a collector terminal connected to an FB terminal of a control IC 12 and an emitter terminal connected to the ground, and a capacitor C2 is connected in parallel between the collector terminal and the emitter terminal.

The control IC 12 has a VH terminal connected to the positive electrode terminal of the input capacitor C1 and a GND terminal connected to the ground. The control IC 12 also has an HO terminal connected to the gate terminal of the switching element Q1 via a resistor R1, and an LO terminal connected to the gate terminal of the switching element Q2 via a resistor R2, and further has a VB terminal, a VS terminal, a CA terminal, an IS terminal, and a VCC terminal. A capacitor C4 is connected between the VB terminal and the VS terminal, and the VS terminal is connected to the common connection point between the switching elements Q1 and Q2. One end of a capacitor Cca is connected to the CA terminal, while the other end of the capacitor Cca is connected to the ground. The IS terminal is connected to the common connection point between a series circuit of a capacitor Cs and resistor Rs connected in parallel to the resonant capacitor C5. The VCC terminal is connected to the positive electrode terminal of the capacitor C3, while the negative electrode terminal of the capacitor C3 is connected to the ground. The VCC terminal is also connected to the anode terminal of the diode D2, and the cathode terminal of this diode D2 is connected to the VB terminal. Note that, the VCC terminal is connected to an auxiliary winding of the transformer T1 via a diode, although not illustrated for simplicity of the view, and after starting-up of this switching power supply apparatus, a voltage generated in the auxiliary winding is used as the power supply of the control IC 12.

Here, the series circuit of the capacitor Cs and resistor Rs connected in parallel to the resonant capacitor C5 is a shunt circuit to shunt the resonant current, and the current shunted by this shunt circuit is converted to a voltage signal by the resistor Rs for current detection, and is input to the IS terminal of the control IC 12. Resonant currents flowing respectively through the resonant capacitor C5 and capacitor Cs have a substantially identical waveform, and the maximum amplitude thereof is determined by the capacitance ratio between the resonant capacitor C5 and the capacitor Cs. If the capacitance of the capacitor Cs is set smaller than the capacitance of the resonant capacitor C5, then only a very small current will flow through the resistor Rs for current detection, allowing the power consumption for current detection to be reduced to a negligible level.

The control IC 12 includes a start-up circuit 21 whose input terminal is connected to the VH terminal, and the output terminal of the start-up circuit 21 is connected to the VCC terminal, as illustrated in FIG. 2. The input terminal of an oscillation circuit 22 is connected to the FB terminal, while the output terminal of the oscillation circuit 22 is connected to a control circuit 23. Note that the FB terminal is pulled up to a non-illustrated reference voltage via a non-illustrated resistor. A high-side output terminal of the control circuit 23 is connected to the input terminal of the high-side drive circuit 24, while a low-side output terminal of the control circuit 23 is connected to the input terminal of the low-side drive circuit 25. An output terminal of the high-side drive circuit 24 is connected to the HO terminal, while an output terminal of the low-side drive circuit 25 is connected to the LO terminal. The high-side drive circuit 24 is also connected to the VB terminal for a high-side power supply and to the VS terminal for a high-side reference potential. The VS terminal is also connected to the control circuit 23 so as to supply a signal VS. The CA terminal is connected to the control circuit 23 and to the load detection circuit 26. The load detection circuit 26 is also connected to the IS terminal, and is further connected so as to receive a signal sw_ctrl from the control circuit 23.

The load detection circuit 26 includes switches sw1 and sw2 connected in series, as illustrated in FIG. 3, and one of the terminals of the switch sw1 is connected to the IS terminal of the control circuit 23 while one of the terminals of the switch sw2 is connected to the GND terminal of the control circuit 23. The IS terminal is connected to the shunt circuit 28 including the capacitor Cs and resistor Rs, and receives a signal IS, i.e., a voltage signal obtained by converting a resonant current. A point A which is the common connection point between the switches sw1 and sw2 is connected to the CA terminal of the control circuit 23 via a resistor Rf. The capacitor Cca is connected to the CA terminal, and an averaging circuit 29 including the resistor Rf and the capacitor Cca averages a voltage signal A at the point A. The switch sw1 also has a control terminal connected to a sw_ctrl terminal for receiving the signal sw_ctrl from the control circuit 23, and the switch sw2 has a control terminal connected to the sw_ctrl terminal via an inverter circuit 27. Here, the switches sw1 and sw2 and the inverter circuit 27 constitute a switching circuit 30 to generate, at the point A, the voltage signal A proportional to an input current utilizing the signal IS and the like.

In the switching power supply apparatus with the above configuration, before the control IC 12 starts the switching control, the start-up circuit 21 of the control IC 12 receiving the DC input voltage Vi supplies a start-up current to the capacitor C3. Once the capacitor C3 is charged, the voltage VCC is supplied to the VCC terminal and to the low-side drive circuit 25. Once the control IC 12 starts the switching control, the power-feeding to the capacitor C3 is performed from the auxiliary winding of the transformer T1.

The control IC 12 controls the switching element Q1 and switching element Q2 to be alternately turned on and off so that the output voltage Vo is held to a predetermined value based on the output voltage Vo of the output circuit on the side of the secondary windings S1 and S2 of the transformer T1.

Therefore, the shunt regulator SR1 detects the output voltage Vo and outputs a current corresponding to an error from a predetermined value, and the error current is fed back to the FB terminal of the control IC 12 by the photo coupler PC1. In the control IC 12, the oscillation circuit 22 adjusts the oscillation frequency in response to the signal FB at the FB terminal, and the control circuit 23 supplies the signals for alternately turning on and off the switching elements Q1 and Q2 to the high-side drive circuit 24 and low-side drive circuit 25. Thus, the switching elements Q1 and Q2 are turned on and off, the period for charging/discharging the resonant capacitor C5 is varied, the electric energy induced to the secondary side of the transformer T1 is adjusted, and the output voltage Vo is controlled so as to be a predetermined value.

Here, a current supplied from the DC input voltage Vi when the switching element Q1 is turned on is equal to a sum of a current flowing through the resonant capacitor C5 and a current flowing through the capacitor Cs. On the other hand, when the switching element Q1 is turned off, the current supplied from the DC input voltage Vi is zero, of course. However, the resonant current flows through the resonant capacitor C5 and capacitor Cs also at this time, and therefore during this period this resonant current is not allowed to be detected as an input current, but a correct input current, i.e., zero current, needs to be detected.

In the load detection circuit 26, first the resonant current is detected by the shunt circuit 28. For the purpose of detection by this shunt, a resistor for current detection does not need to be inserted in a path on which the resonant current itself flows, and thus a loss is hardly generated, thereby allowing for a highly efficient operation. The resonant current detected by the shunt circuit 28 is converted to the voltage signal IS by the resistor Rs, and is input to the IS terminal. This signal IS is input to the switching circuit 30. A signal of the ground level is input also to the switching circuit 30, so that the voltage signal A proportional to an input current may be obtained also when the switching element Q1 is turned off. This switching circuit 30 controls the switching of signals using the signal sw_ctrl from the control circuit 23. In the present embodiment, the signal sw_ctrl is generated, in the control circuit 23, based on the signal VS serving as the high-side reference potential.

The signal VS has the same cycles as the on/off cycles of the switching element Q1, as illustrated in FIG. 4. Note that a signal HO for driving the switching element Q1 rises later than the signal VS and falls earlier than the signal VS by the amount of a dead time. The control circuit 23 supplies this signal VS to the switching circuit 30 as the signal sw_ctrl. The signal VS is at a high (H) level from the rising time to falling time thereof, while from the falling time to rising time the signal VS is at a low (L) level.

The switching circuit 30 turns on the switch sw1 while the signal sw_ctrl is at an H level from the rising time to falling time thereof. At this time, the switch sw2 is turned off because the logic of the signal sw_ctrl is inverted by the inverter circuit 27. Moreover, while the signal sw_ctrl is at an L level from the falling time to rising time thereof, the switch sw1 is turned off and the switch sw2 is turned on.

Thus, while the signal sw_ctr is at an H level, the signal IS, i.e., a voltage (first voltage signal) proportional to a current I_Q1 flowing through the high-side switching element Q1, the current I_Q1 being the input current, is applied to the point A. On the other hand, when the signal sw_ctrl is at an L level, the switch sw1 is turned off and the switch sw2 is turned on, and therefore a signal (second voltage signal) of the ground level indicating that the input current is zero will be applied to the switching circuit 30. Thus, the point A is switched to the voltage signal A of the ground level (a third voltage signal). The voltage signal A (the third voltage signal) at the point A switched by the signal sw_ctrl is averaged by the averaging circuit 29, and a voltage signal VCA proportional to an average value of the input current is generated at the CA terminal.

As described above, in the load detection circuit 26, the first signal proportional to the current I_Q1 which flows when the high-side switching element Q1 is turned on, and the second signal of the ground level indicative of zero of the input current when the switching element Q1 is turned off are averaged by the averaging circuit 29. Because the ground level when the switching element Q1 is turned off is added in averaging by the averaging circuit 29, an average value of the input current of the switching power supply apparatus, i.e., a load state of the switching power supply apparatus, may be accurately detected.

An average value of the input current detected in this manner is supplied to the control circuit 23 from the CA terminal as a signal indicative of a load state. In the control circuit 23, for example when the load state is recognized, upon receipt of the voltage signal VCA, as a very light load state, the voltage signal VCA is used, for example, in order to determine to switch to burst control.

Note that, while the switching power supply apparatus is performing a burst operation, the point A is forcibly set to the ground level during the burst operation, as illustrated in FIG. 5. Accordingly, the load detection circuit 26 will detect an average value of the input current of the switching power supply apparatus taking into consideration also the ground level during the burst operation, and therefore this switching power supply apparatus will handle burst control and the like.

Second Embodiment

Figure 6:
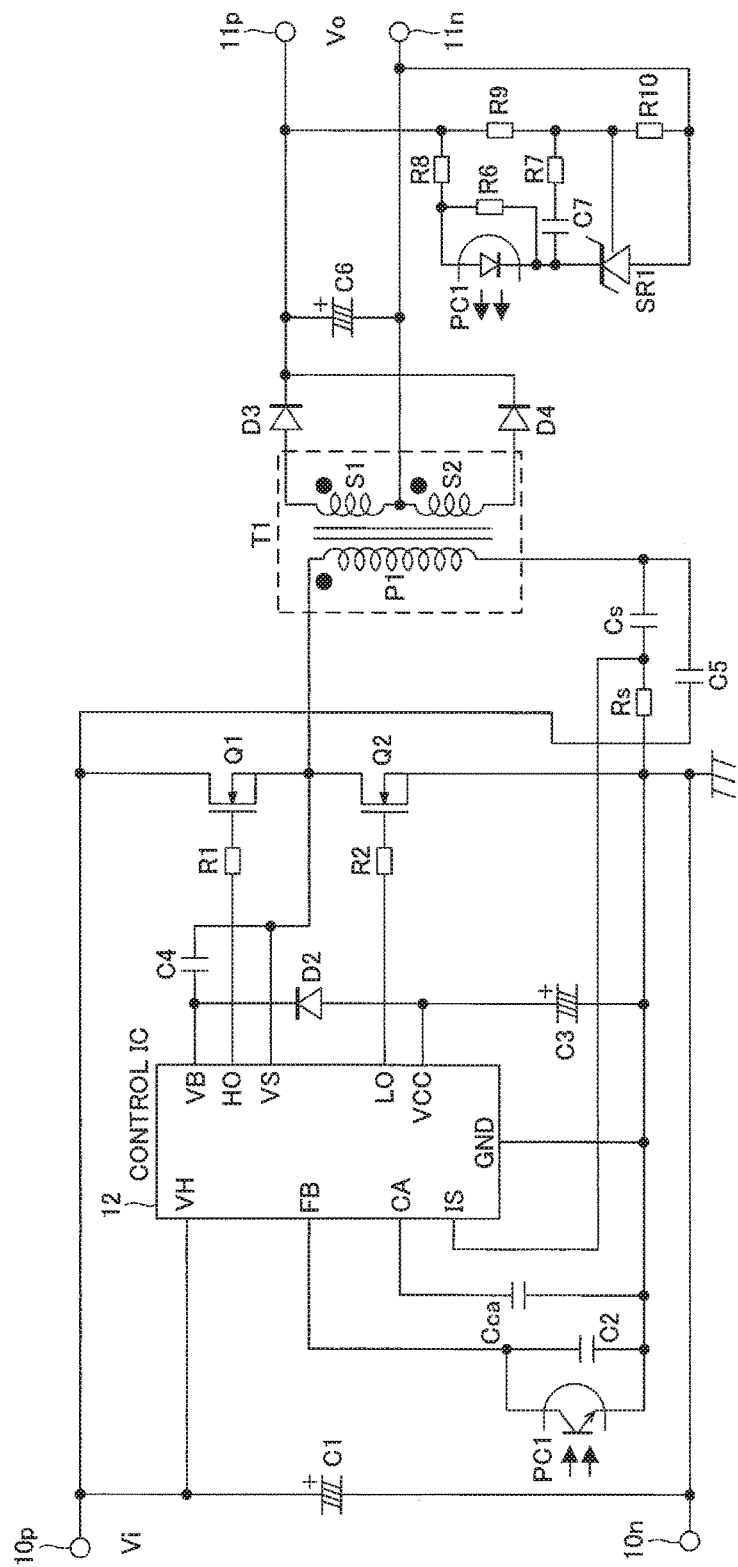
FIG. 6 is a circuit diagram illustrating a switching power supply apparatus according to a second embodiment.
Figure 7:
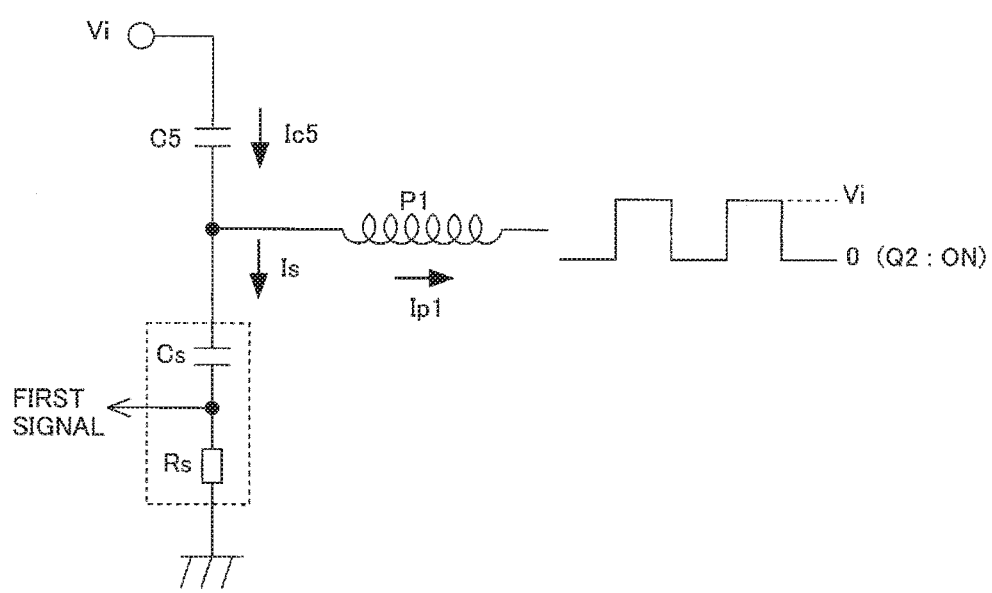
FIG. 7 is a circuit diagram illustrating a shunt circuit of a resonant current in the switching power supply apparatus according to the second embodiment.

FIG. 6 is a circuit diagram illustrating a switching power supply apparatus according to a second embodiment, while FIG. 7 is the circuit diagram illustrating a shunt circuit of a resonant current in the switching power supply apparatus according to the second embodiment. Note that, in FIGS. 6 and 7, the component same as or similar to the component illustrated in FIG. 1 is given the same reference sign to omit the detailed description thereof.

The switching power supply apparatus according to the second embodiment has the resonant capacitor C5 arranged between the input terminal 10p of the positive electrode and the other end of the primary winding P1 of the transformer T1, as compared with the switching power supply apparatus according to the first embodiment. Therefore, in this switching power supply apparatus, a signal proportional to the current I_Q2 (see FIG. 4) which flows when the low-side switching element Q2 is turned on is the first signal. Moreover, the shunt circuit for load detection (the series circuit of the capacitor Cs and resistor Rs) is arranged between the other end of the primary winding P1 of the transformer T1 and the ground, i.e., in parallel to the primary winding P1 when the switching element Q2 is turned on, so as to shunt the resonant current flowing through the resonant capacitor C5.

Also in the switching power supply apparatus according to the second embodiment, for the control IC 12 and the load detection circuit 26 therein, the same components as the components of the switching power supply apparatus according to the first embodiment are used except the relationship between the signal VS and the signal sw_ctrl. That is, the signal sw_ctrl of the switching power supply apparatus according to the first embodiment is the same as the signal VS, as illustrated in FIG. 4, while the signal sw_ctrl input to the load detection circuit 26 from the control circuit 23 in the switching power supply apparatus according to the second embodiment is a signal obtained by inverting the signal VS.

According to the switching power supply apparatus according to the second embodiment, the load detection circuit 26 receives, as the first signal, a current proportional to the current I_Q2 which flows when the low-side switching element Q2 is turned on. That is, in FIG. 7, a current Icy which flows through the resonant capacitor C5 when the low-side switching element Q2 is turned on is shunted to a current Ip1 flowing through the primary winding P1 of the transformer T1 and to a current Is flowing through the shunt circuit 28. The current Is shunted to the shunt circuit 28 is converted to the voltage signal IS by the resistor Rs. The voltage signal IS serves as the first signal and is input to the IS terminal. On the other hand, when the low-side switching element Q2 is turned off, the load detection circuit 26 receives the second signal of the ground level indicative of zero of the input current when the switching element Q1 is turned on, and the averaging circuit 29 averages the first signal and the second signal. Because this averaging is not the averaging of a partial resonant current only when the switching element Q2 is turned on, an average value of the input current of the switching power supply apparatus, i.e., a load state of the switching power supply apparatus, may be detected with high precision.

Third Embodiment

Figure 8:
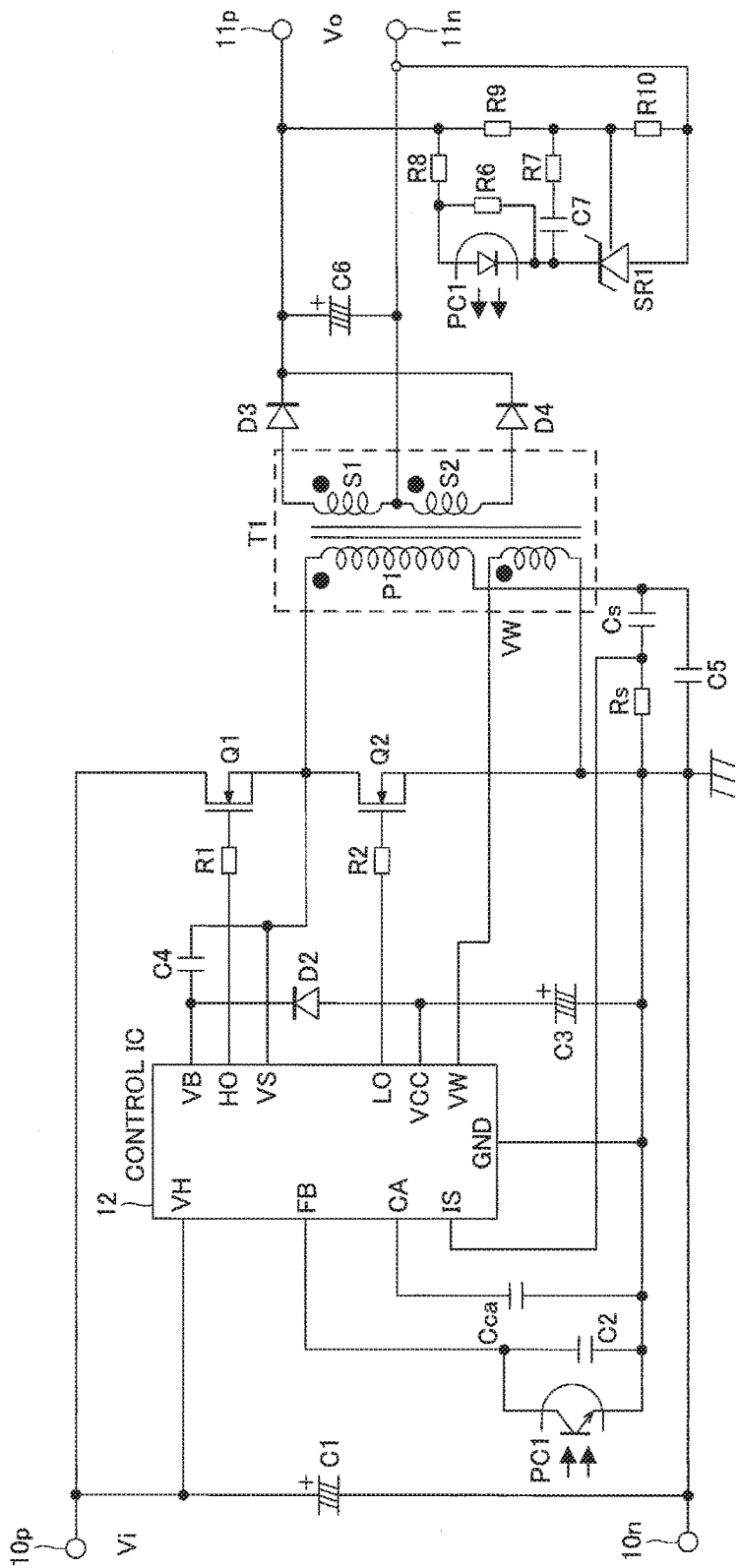
FIG. 8 is a circuit diagram illustrating a switching power supply apparatus according to a third embodiment.
Figure 9:
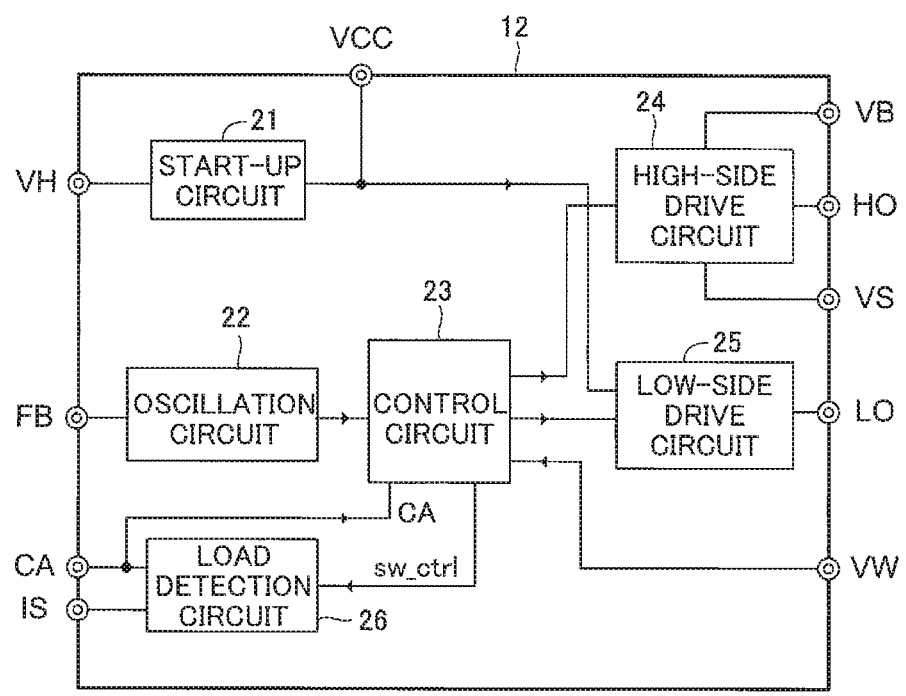
FIG. 9 illustrates a configuration example of the control IC.

FIG. 8 is a circuit diagram illustrating a switching power supply apparatus according to a third embodiment, while FIG. 9 illustrates a configuration example of the control IC. Note that, in FIG. 8, the component same as or similar to the component illustrated in FIG. 1 is given the same reference sign to omit the detailed description thereof. Similarly, in FIG. 9, the component same as or similar to the component illustrated in FIG. 2 is given the same reference sign to omit the detailed description thereof.

In the switching power supply apparatuses according to the first and second embodiments, a switching timing between the first signal of the resonant current to be averaged and the second signal of the ground level is based on the VS signal. In contrast, in the switching power supply apparatus according to the third embodiment, the switching timing between the first signal and the second signal is based on a signal VW generated by an auxiliary winding VW of the transformer T1. For this auxiliary winding VW, a winding for supplying power to the control IC 12 after the switching power supply apparatus is started up is used. One of the terminals of the auxiliary winding VW is connected to the VW terminal of the control IC 12 while the other terminal of the auxiliary winding VW is connected to the ground.

In the control IC 12, as illustrated in FIG. 9, the VW terminal is connected to the control circuit 23, and the control circuit 23 may obtain a signal similar to the VS signal by shaping the waveform of a signal from the VW terminal, and based on this signal, generate the signal sw_ctrl. The signal sw_ctrl alternately switches the switches sw1 and sw2 in a switching circuit 30 of the load detection circuit 26. Thus, the switches sw1 and sw2 are switched to a voltage signal indicative of a resonant current detected by the shunt circuit 28 or to a signal of the ground level. These signals are alternately averaged by the averaging circuit 29, so that a load state accurate as the whole is detected.

Fourth Embodiment

Figure 10:
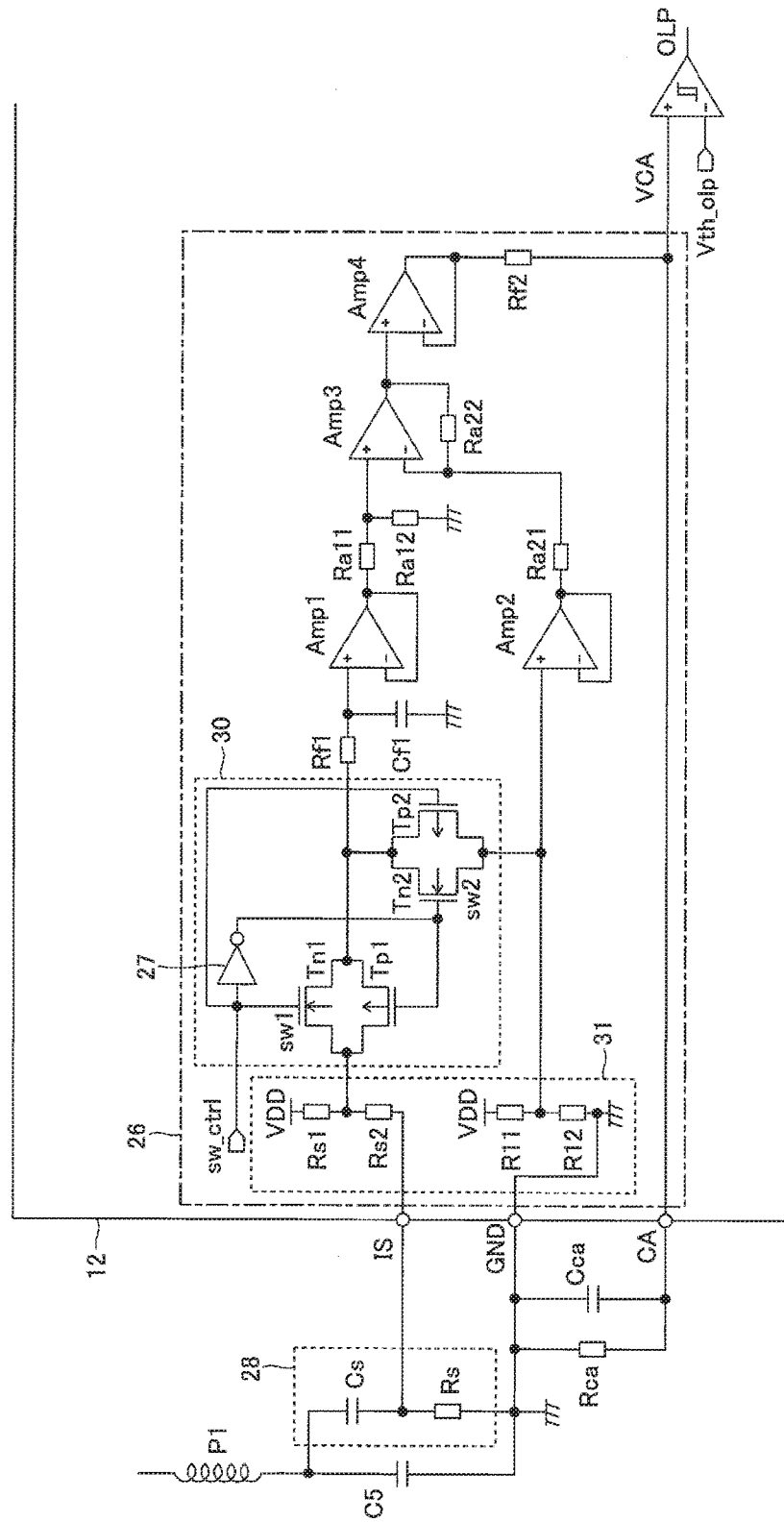
FIG. 10 is a circuit diagram illustrating a control IC for a switching power supply apparatus according to a fourth embodiment.
Figure 11:
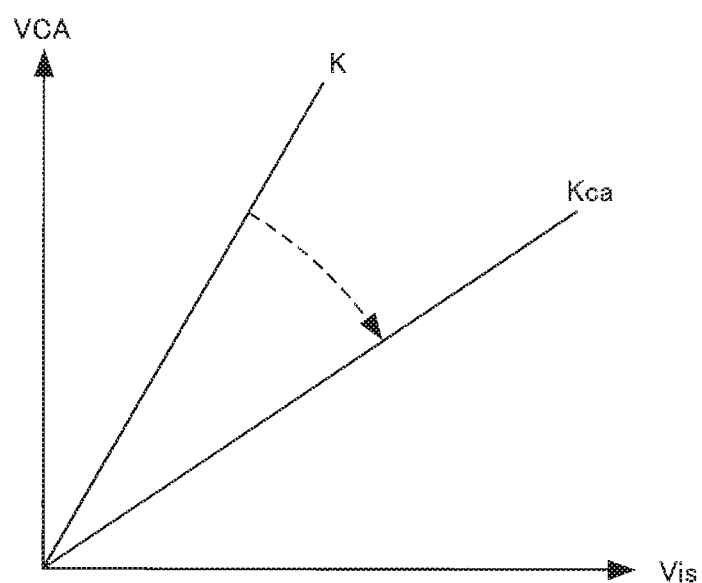
FIG. 11 illustrates a voltage relationship between an IS terminal and a CA terminal of the control IC.

FIG. 10 is a circuit diagram illustrating a control IC for a switching power supply apparatus according to a fourth embodiment, and FIG. 11 illustrates a voltage relationship between the IS terminal and CA terminal of a control IC. Note that, in FIG. 10, the component same as or similar to the component illustrated in FIGS. 1 and 3 is given the same reference sign to omit the detailed description thereof.

In the switching power supply apparatus according to the fourth embodiment, the switches sw1 and sw2 of the switching circuit 30 included in the load detection circuit 26 of the switching power supply apparatus according to the first embodiment are constituted from semiconductor switches (transmission gates). That is, the switch sw1 of the switching circuit 30 is formed by connecting complementary transistors Tp1 and Tn1 in parallel, while the switch sw2 is formed by connecting complementary transistors Tp2 and Tn2 in parallel. The signal sw_ctrl is applied to the gate terminal of the transistor Tn1 of the switch sw1 and to the gate terminal of the transistor Tp2 of the switch sw2. On the other hand, a signal obtained by logically inverting the signal sw_ctrl by an inverter circuit 27 is applied to the gate terminal of the transistor Tp1 of the switch sw1 and to the gate terminal of the transistor Tn2 of the switch sw2.

The terminal of the switch sw1 receiving the first signal and the terminal of the switch sw2 receiving the second signal are connected to the IS terminal and GND terminal of the control IC 12 via a level shift circuit 31, respectively. This level shift circuit 31 includes resistors Rs1 and Rs2 connected in series. One end of the resistor Rs1 is connected to the VDD terminal of the power supply, while the other end of the resistor Rs2 is connected to the IS terminal, and the connection point between the resistors Rs1 and Rs2 is connected to the switch sw1 of the switching circuit 30. Moreover, the level shift circuit 31 includes resistors R11 and R12 connected in series. One end of the resistor R11 is connected to the VDD terminal of the power supply, while the other end of the resistor R12 is connected to the GND terminal, and the common connection point between the resistors R11 and R12 is connected to the switch sw2 of the switching circuit 30.

The level shift circuit 31 has a function to level-shift the signal IS (first signal) indicative of the shunted current Is and the second signal of the ground level to the positive side, respectively. That is, due to resonating of the resonant circuit of the resonant reactor and resonant capacitor C5, the signal IS applied to the IS terminal of the control IC 12 has an amplitude swinging in the plus and minus directions with reference to the ground level. The level shift circuit 31 level-shifts the potential of the IS terminal and the potential of the GND terminal to the plus side by the amount of the swing in the minus direction. Thus, when the voltage between the IS terminal and the GND terminal is ±Vis/2, the amplitude of the signal IS (first signal) input to the switches sw1 and sw2 of the switching circuit 30 will be shifted from ±Vis/2 to +Vis. That is, a minus potential will not be applied to the switches sw1 and sw2. Here, for example, when the switch sw1 is turned off upon receipt of the signal sw_ctrl of an L level (0 V), both the transistors Tn1 and Tp1 are supposed to be turned off. However, if a minus potential may be applied to the switch sw1, the transistor Tn1 will have the gate potential of an L level relatively higher than the applied potential and therefore will be turned on. This phenomenon will similarly occur also in the switch sw2. As described above, in the fourth embodiment, the inconvenience caused by the switches sw1 and sw2 being formed from a semiconductor switch will be prevented by the level shift circuit 31. Moreover, the level shift circuit 31 also has a function to prevent the latch-up caused by a negative voltage being input to a semiconductor.

The common connection point between the switches sw1 and sw2 of the switching circuit 30 is connected to one end of a resistor Rf1, and the other end of the resistor Rf1 is connected to one end of a capacitor Cf1 and to the noninverting input of an amplifier (operational amplifier) Amp1. The other end of the capacitor Cf1 is connected to the ground (GND terminal). Here, the resistor Rf1 and the capacitor Cf1 are formed in the control IC 12 and therefore constitute a filter with a small time constant, and have a function to reduce the noise caused by the switches sw1 and sw2 of the switching circuit 30 rather to average the output voltage of the switching circuit 30. The amplifier Amp1 constitutes a voltage follower by connecting the inverting input and output thereof. On the other hand, the common connection point between the switch sw2 of the switching circuit 30 and the level shift circuit 31 is connected to the noninverting input of an amplifier (operational amplifier) Amp2. The amplifier Amp2 constitutes a voltage follower by connecting the inverting input and output thereof.

The output of the amplifier Amp1 is connected to one end of a resistor Ra11, and the other end of the resistor Ra11 is connected to one end of a resistor Ra12 and to the noninverting input of an amplifier (operational amplifier) Amp3. The other end of the resistor Ra12 is connected to the ground. Moreover, the output of the amplifier Amp2 is connected to one end of a resistor Ra21, and the other end of the resistor Ra21 is connected to the inverting input of an amplifier Amp3. The inverting input of the amplifier Amp3 is connected to the output of the amplifier Amp3 through a resistor Ra22. Thus, the amplifier Amp3 constitutes a differential amplifier circuit which amplifies a potential difference between the output voltage of the amplifier Amp1 and the output voltage of the amplifier Amp2. Here, if the output voltage of the amplifier Amp1 is VA, the output voltage of the amplifier Amp2 is VB, Ra11=Ra21, and Ra12=Ra22, then an output voltage VC of this differential amplifier circuit is VC=(VA−VB)×K
where K is an amplification factor and is K=Ra12/Ra11=Ra22/Ra21.

The output of the amplifier Amp3 is connected to the noninverting input of an amplifier (operational amplifier) Amp4. The amplifier Amp4 constitutes a voltage follower by connecting the inverting input and output thereof. The output of the amplifier Amp4 is connected to the CA terminal of the control IC 12 through a resistor Rf2. One end of the capacitor Cca which averages the signal of a combination of the first signal of the signal IS and the second signal of the ground level is connected to this CA terminal, while the other end of the capacitor Cca is connected to the ground. Also to the capacitor Cca externally connected to this control IC 12, a resistor Rca is connected in parallel.

As described above, the first signal of the signal IS and the second signal of the ground level are level-shifted by the level shift circuit 31, respectively. These first signal and second signal pass through the switching circuit 30 while being level-shifted, and then the amount of the level shift is canceled by the differential amplifier circuit, and is averaged by the resistor Rf2 and capacitor Cca. The differential amplifier circuit may amplify the potential difference (VA−VB) between the output voltages of the amplifiers Amp1 and Amp2, and therefore may magnify the signal with reference to the signal IS of a small level, thereby facilitating the detection of a load state.

Next, a voltage relationship between the IS terminal and CA terminal of the control IC 12 will be described with reference to FIG. 11. In this graph illustrated in FIG. 11, the horizontal axis represents the voltage signal Vis at the IS terminal, while the vertical axis represents the voltage signal VCA at the CA terminal. Here, when the external resistor Rca is not connected, the relationship between the voltage signal Vis at the IS terminal and the voltage signal VCA at the CA terminal is expressed with a straight line denoted by K. That is, this straight line corresponds to the gain characteristic of the load detection circuit 26 determined by a constant (amplification factor K of the differential amplifier circuit) inside the control IC 12 and the capacitance value of the external capacitor Cca. In contrast, if the resistor Rca is connected in parallel to the capacitor Cca, the gain characteristic of the load detection circuit 26 becomes a gain characteristic with a changed gradient, such as the straight line denoted by Kca. That is, the gain characteristic of the load detection circuit 26 may be arbitrarily varied by varying the values of the external resistor Rca and capacitor Cca.

Note that, in the present embodiment, the voltage signal VCA representing a load state which has been detected in this manner is used in an overload detection circuit. That is, the connection point between the resistor Rf2 and the CA terminal is connected to the noninverting input of a comparator OLP for overload protection, and a reference voltage Vth_olp is applied to the inverting input of the comparator OLP for overload protection. Thus, the comparator OLP for overload protection will output a signal of an H level if the voltage signal VCA proportional to an average value of the input current exceeds the reference voltage Vth_olp, and the control IC 12 forcibly turns off the switching elements Q1 and Q2.

Fifth Embodiment

Figure 12:
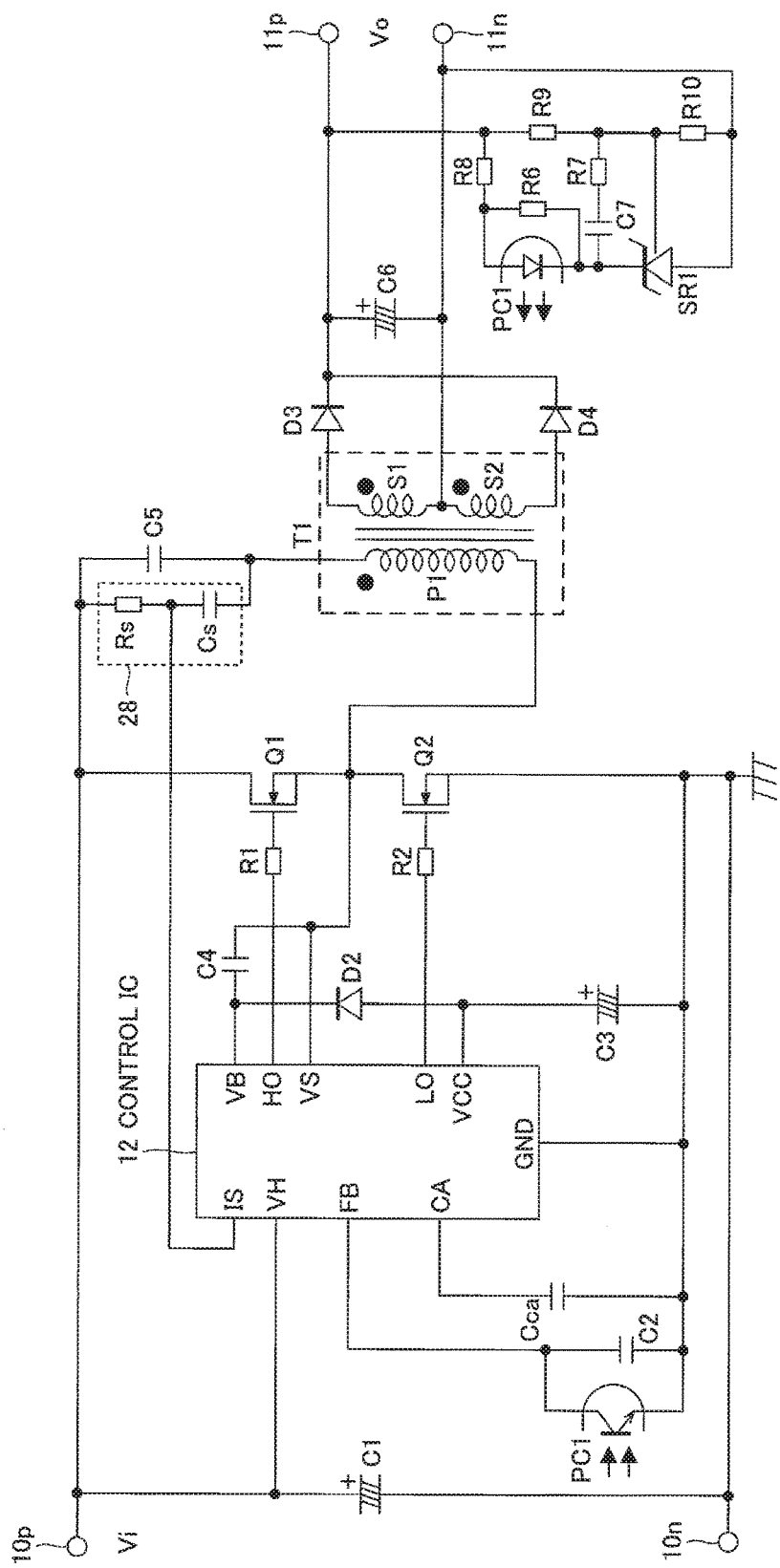
FIG. 12 is a circuit diagram illustrating a switching power supply apparatus according to a fifth embodiment.

FIG. 12 is a circuit diagram illustrating a switching power supply apparatus according to a fifth embodiment. Note that, in FIG. 12, the component same as or similar to the component illustrated in FIG. 1 is given the same reference sign to omit the detailed description thereof.

In the switching power supply apparatus according to the fifth embodiment, the resonant circuit of the resonant reactor and resonant capacitor C5 is connected in parallel to the high-side switching element Q1, as compared with the switching power supply apparatus according to the first embodiment. The shunt circuit 28 which shunts the resonant current is connected in parallel to the resonant capacitor C5, a signal representing the current proportional to the resonant current is extracted from the common connection point between the resistor Rs and capacitor Cs of the shunt circuit 28, and is input to the IS terminal of the control IC 12.

The signal extracted from the shunt circuit 28 is the terminal voltage of the resistor Rs with reference to the potential of the DC input voltage Vi. Therefore, the signal with reference to the potential of the DC input voltage Vi is preferably, in the inside of the control IC 12, converted to the signal with reference to the ground, and the converted signal may be input to the load detection circuit 26.

In the foregoing, the preferred embodiments of the present disclosure have been described, but the present disclosure is not limited to the above-described embodiments. For example, in the above embodiments, the inside of the control IC 12 is realized by analog circuits, but also in the so-called digital power supply apparatus obtained by digitizing the inside of the control IC 12, the concept of the shunt circuit 28, switching circuit 30, and averaging circuit 29 may be applicable.

The switching power supply apparatus with the above-described configuration may always obtain a signal proportional to an input current, and therefore may accurately recognize the input power directly linked with the output power, in any situations.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. A switching power supply apparatus of a current-resonance type, comprising:
   a first switching element and a second switching element connected in series;
   a series circuit of a resonant reactor and a resonant capacitor connected in parallel to the first switching element or the second switching element;
   a control circuit configured to alternately turn on and off the first switching element and the second switching element; and
   a load detection circuit, including:
      a shunt circuit which shunts a resonant current flowing through the resonant reactor and resonant capacitor connected in series to obtain a shunted current, converts the shunted current to a first voltage signal, and outputs the first voltage signal;
      a switching circuit which switches between the first voltage signal and a second voltage signal of a ground level to generate a third voltage signal; and
      an averaging circuit which averages the third voltage signal.

2. The switching power supply apparatus according to claim 1, wherein the shunt circuit includes a series circuit of a first capacitor and a first resistor, the series circuit being connected in parallel to the resonant capacitor, and the first voltage signal is generated by a current flowing through the first resistor.

3. The switching power supply apparatus according to claim 1, wherein the switching circuit includes a first switch and a second switch connected in series, and an inverter circuit which turns off, when one of the first switch and the second switch is turned on, the other of the first switch and the second switch, wherein the first voltage signal is input to the first switch and the second voltage signal is input to the second switch, and wherein the switching circuit outputs the third voltage signal from a common connection point between the first switch and the second switch.

4. The switching power supply apparatus according to claim 3, further comprising:

a level shift circuit which
level-shifts the first voltage signal and inputs the level-shifted first voltage signal to the first switch, and
level-shifts the second voltage signal and inputs the level-shifted second voltage signal to the second switch; and a differential amplifier circuit which
amplifies a potential difference between the third voltage signal and the level-shifted second voltage signal, and inputs a resulting signal of the amplification to the averaging circuit, wherein each of the first switch and the second switch includes a transmission gate.

5. The switching power supply apparatus according to claim 4, wherein the differential amplifier circuit has two inputs and an output, and the load detection circuit further includes voltage followers arranged at the two inputs and the output of the differential amplifier circuit, respectively.

6. The switching power supply apparatus according to claim 1, wherein the averaging circuit includes a series circuit of a second resistor and a second capacitor, and averages the third voltage signal by the second resistor and the second capacitor.

7. The switching power supply apparatus according to claim 1, wherein the switching circuit determines timing to switch between the first voltage signal and the second voltage signal based on a voltage signal at a common connection point between the first switching element and the second switching element.

8. The switching power supply apparatus according to claim 1, wherein the resonant reactor includes a transformer, and the switching circuit determines timing to switch between the first voltage signal and the second voltage signal based on a voltage signal generated by an auxiliary winding of the transformer.

* * * * *